Figure 1:
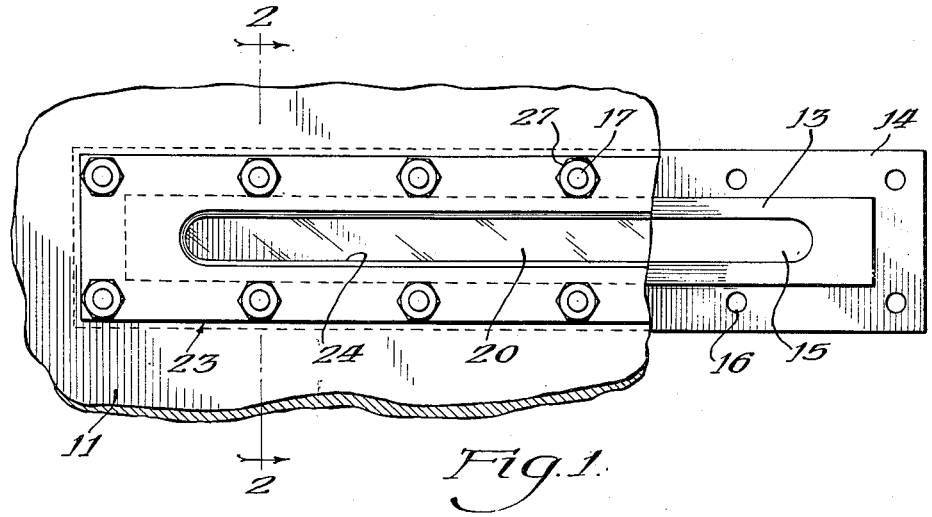

Oct. 31, 1950     F. A. BUEHLER     2,527,792
WELDABLE SIGHT GLASS STRUCTURE

Filed Dec. 27, 1947

INVENTOR.
Frank A. Buehler
BY
Donald E. Payne
Attorney

Patented Oct. 31, 1950

2,527,792

UNITED STATES PATENT OFFICE 2,527,792

WELDABLE SIGHT GLASS STRUCTURE

Frank A. Buehler, Hammond, Ind., assignor to Standard Oil Company, Chicago, Ill., a corporation of Indiana Application December 27, 1947, Serial No. 794,196

3 Claims. (Cl. 220—82)

This invention relates to an improved weldable sight glass structure and it pertains more particularly to an improved structure for providing a window for pressure vessels such as reactors, storage tanks, refinery "look boxes" and the like.

Within the last year two disastrous fires were caused in a large petroleum refinery because of failure of the sight glasses in pumphouse look boxes (steel chambers provided with glass windows, the chambers in this case being connected in an oil line leading to a pump in a large petroleum refinery unit). An object of this invention is to provide a sight glass structure which will avoid such failures.

A further object is to provide a sight glass structure which will provide a window for pressure vessels and which can be installed without warpage or undue internal stresses or strains. A further object is to provide a structure which can be welded inside the vessel so that the glass receiving surface will not be warped, marred or disfigured so that it will not have to be machined after the welding operation. A further object is to provide a structure which will minimize corrosion difficulties. Another object is to provide a structure of greater simplicity and structural strength than those heretofore available and which will at the same time make full provision for expansion and contraction. Other objects will be apparent as the detailed description of the invention proceeds.

Instead of welding a sight glass support to the outside of a pressure vessel I provide a sight glass support which is T-shaped in cross section wherein an opening extends through the vertical leg of the T, the vertical leg extends through a slot in the pressure vessel, the sight glass rests on a gasket on the outer end of the hollow vertical leg and the laterally extending edges of the T-shaped structure bear against the inner walls of the pressure vessel and are welded thereto. The cover plate, which is provided with an opening in alignment with that in the T-shaped member, clamps and holds the glass in place and provides for any necessary expansion or contraction, the cover plate preferably being held in place by stud bolts which may extend not only through the wall of the pressure vessel but also into the extending ends or shoulders of the T-shaped member. With such structure the weld is inside the pressure vessel so that it prevents the entrance of any fluid between the vessel walls and the sight glass support. The weld is a sufficient distance from the sight glass supporting surface so that said surface is not distorted during the welding operation and since the welding operation is inside the tank the sight glass supporting surface does not become scored or marred by metal splash, arcing, etc. during the welding operation. The stud bolts as well as the pressure itself supplements the weld in holding the sight glass support in position.

Figure 2:
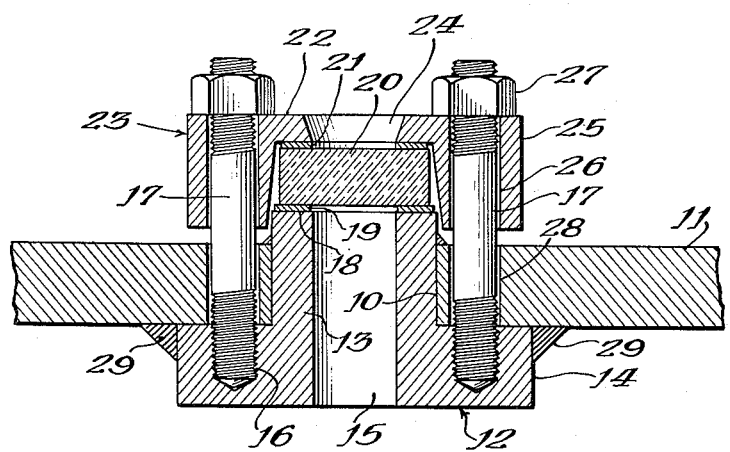

The invention will be more clearly understood from the following detailed description of a specific example read in conjunction with the accompanying drawings which form a part of the specification and in which:

Figure 1 is a plan view of my improved sight glass structure with parts broken away to show the supports more clearly, and Figure 2 is a vertical section taken along the lines 2—2 of Figure 1.

While the invention is applicable to metallic vessels generally, it is particularly applicable to pressure vessels such for example as those employed in the petroleum and chemical industries. The sight glasses may be employed as windows for storage tanks, reactors or look boxes. In relatively small vessels the sight glasses may be mounted on opposite sides of the vessel in alignment with each other so that light from one window will facilitate visual observation through the other. For petroleum refining equipment and many other purposes the pressure vessel may be of steel or alloy steels known to those skilled in the art and the sight glass support may be fabricated from like steel. The particular metal employed will of course depend upon the fluids to be handled.

Referring to a particular sight glass structure for a look box designed to operate at a pressure of about 100 p. s. i. or more, a slot 10 is cut into vessel wall 11 which slot in this case may be about 1¼ inch wide, by about 12 inches long. A bar 12 of T-shape cross section is fabricated so that the vertical leg or central portion 13 of the T may extend through and fit rather snuggly against the walls of opening 10, the laterally extending shoulders 14 extending about ¾ inch on all sides of slot 10 and designed to fit closely against the inner walls of the pressure vessel. A ⅝-inch opening 15 is provided in the center of the inner section of the bar so that a wall thickness of about $\frac{5}{16}$-inch is provided along the lateral and end walls within slot 10. The shoulder section is about ⅝-inch thick and it is tapped and provided with internal threads 16 for receiving the lower threaded ends of stud bolts 17.

The upper surface 18 on the outer end of projecting portion 13 is carefully machined to give a flat surface for supporting gasket 19 which in turn supports sight glass 20. The particular type of gasket material will depend of course upon the nature of the fluids to be handled, the temperatures to be employed, etc.; tetrafluor ethylene polymer gasket material is highly desirable because it withstands high temperatures and corrosive materials but any suitable gasket material such as asbestos, neoprene, thiakol, silicone rubber or soft metal, etc. may be used. The glass itself may be of the type commonly employed for gauge glasses subjected to high temperature (such for example as Pyrex glass) and it may be a solid or laminated bar which in this case is about $\frac{1}{8}$-inch thick and about 1⅛ inch wide.

Another gasket 21 is preferably interposed between the upper surface of the glass and the shoulders 22 of cover plate 23, the top of the cover plate having an opening 24 in alignment with opening 15. Sufficient clearance is provided in the cover plate at the base of shoulders 22 to provide for any expansion of the glass during normal operation. The cover plate may be of the same composition as bar 12 and may for example be a carefully machined steel forging.

The peripheral portion 25 of cover plate 23 is provided with openings 26 for receiving stud bolts 17 and the cover plate is clamped against the glass by means of nuts 27. It should be understood of course that openings 28 are also provided in the vessel walls in alignment with openings 26 and immediately above the tapped and threaded openings 16 so that the stud bolts which are screwed into the relatively thick base of shoulders 14 and extend through openings 28 and 26.

Either before or after the sight glass is mounted in place as hereinabove described, the outwardly extending shoulders 14 are secured to vessel walls 11 by a continuous weld 29 inside the vessel. This continuous weld prevents any fluid from entering the space between shoulder 14 and vessel wall 11 and thereby prevents corrosion. The weld not only prevents the leakage of any fluids but provides a stronger bond between the vessel walls and the sight glass structure; it should be noted however that the welded joint does not have to withstand the pressure as was the case when sight glass structures were simply welded on the outside of a vessel. In view of the fact that bar 12 is welded to the inner walls of the vessel itself, such bar is sometimes referred to as a "welding pad" and an outstanding feature of this invention is the use of a welding pad of such design that the welding operation does not distort or mar the glass receiving surface 18. The general size, shape and proportions of the welding pad insure maximum strength and safety at minimum expense. The installation is extremely simple.

While I have described in considerable detail a specific form of sight glass window it should be understood that the invention is not limited thereto since the sight glass and supporting structure may be of various sizes and shapes and the welding pad may likewise be of various other shapes and proportions as will be apparent to those skilled in the art from the above description. Likewise, central proportion 13 may be of such width and thickness that the stud bolts may be mounted directly therein instead of extending through the vessel walls. In all cases however the supporting shoulders for the sight glass support are within the pressure vessel itself.

I claim:

1. A sight glass window structure for a pressure vessel provided with a wall opening which structure comprises a bar of T-shaped cross section and with an opening extending through the central leg thereof, a bearing surface at one end of said central leg and extending around said opening, laterally extending shoulders extending from the other end of the central leg and shaped to fit against the inner portion of the pressure vessel wall around the wall opening and to extend a sufficient distance from said wall opening so that the peripheral edges of the shoulders may be welded to the inner portion of the pressure vessel wall without distortion of the bearing surface, a cover plate provided with an opening in alignment with the opening in the bar of T-shaped cross section, said cover plate being provided with a bearing surface around the opening therethrough and bolts threaded in said bar for clamping a sight glass between said bearing surfaces.

2. A sight glass window structure for pressure vessels which comprises a welding pad of T-shaped cross sectional area, said pad having an apertured central portion fitting in a vessel opening, a bearing surface at one end of the central portion, and outwardly extending shoulders extending from the other end of the central portion and shaped to conform with the inner wall of the vessel around the opening therein, a continuous weld between said shoulders and said vessel wall, a gasket on said bearing surface, a sight glass on said gasket, an apertured cover plate for holding said glass on said gasket, and bolts threaded in said pad for positioning and tightly holding said cover plate.

3. A sight glass window structure for a pressure vessel which comprises a welding pad of T-shaped cross sectional area, said pad having an apertured central portion fitting in a vessel opening, a bearing surface at one end of the central portion, outwardly extending shoulders extending from the other end of said central portion for a substantial distance and shaped to conform with the inner wall of the vessel around the opening therein, a continuous weld between said shoulders and said vessel wall, a gasket on said bearing surface, a sight glass on said gasket, a second gasket on said sight glass, an apertured cover plate with a surface around its aperture for bearing against said second gasket and a plurality of stud bolts extending through aligned openings in said cover plate and vessel wall respectively and threaded into the shoulder portions of the welding pad for holding said sight glass in place.

FRANK A. BUEHLER.

REFERENCES CITED

The following references are of record in the file of this patent:

UNITED STATES PATENTS

| Number | Name | Date |
|---|---|---|
| 2,112,924 | Molloy et al. | Apr. 5, 1938 |
| 2,264,413 | Siegerist | Dec. 2, 1941 |
| 2,393,967 | Brubaker | Feb. 5, 1946 |
| 2,456,262 | Fields | Dec. 14, 1948 |